United States Patent

[11] 3,582,024

| [72] | Inventors | Arthur Neville Rhodes<br>Preston;<br>Ian C. Taig, St. Annes, both of, England |
|---|---|---|
| [21] | Appl. No. | 844,127 |
| [22] | Filed | July 23, 1969 |
| [45] | Patented | June 1, 1971 |
| [73] | Assignee | British Aircraft Corporation Limited |

[54] AIRCRAFT ARRESTING HOOK CENTERING MECHANISM
5 Claims, 6 Drawing Figs.

[52] U.S. Cl................................................. 244/110,
213/19, 213/20, 280/488
[51] Int. Cl................................................. B64c 25/68
[50] Field of Search............................................ 244/110;
267/52, 54, 48, 47; 213/19, 20; 280/489, 488, 483

[56] References Cited
UNITED STATES PATENTS
1,358,930  11/1920  Buhoup........................  213/19
1,647,619  11/1927  Hall..............................  244/110
1,893,591  1/1933   Minshall......................  244/110

*Primary Examiner*—Milton Buchler
*Assistant Examiner*—Paul E. Sauberer
*Attorney*—Sughrue, Rothwell, Mion, Zinn & Macpeak ABSTRACT: A self-centering mechanism according to this invention comprises a first member and a second member connected to one another by a main pivot and urged towards a predetermined relative angular position by two springs, and each spring has the form of a beam, the springs lying with their lengths substantially parallel to one another and being each mounted on the first member by a respective pivot at an intermediate point in the length of each spring, the three pivots being substantially parallel to one another, each spring having at one end two surfaces to cooperate with abutments respectively on the first member and the second member, and the other ends of the two springs being interconnected so that, upon displacement of the members from the predetermined relative position, both springs are stressed in bending.

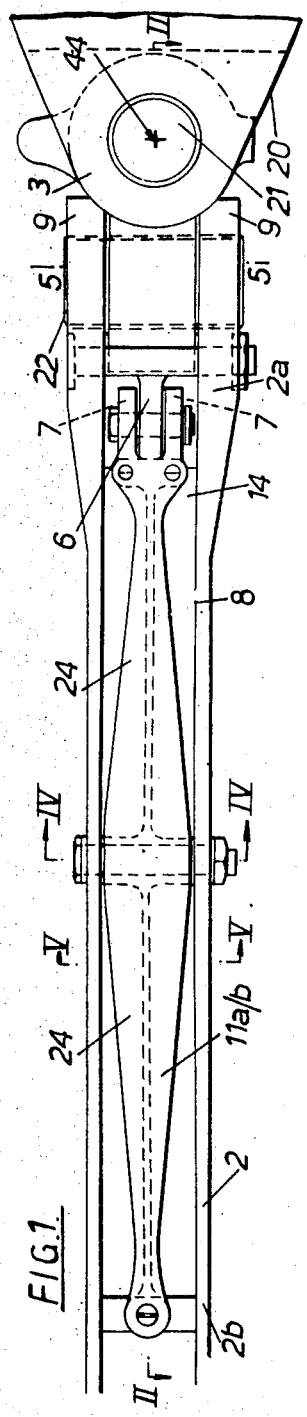
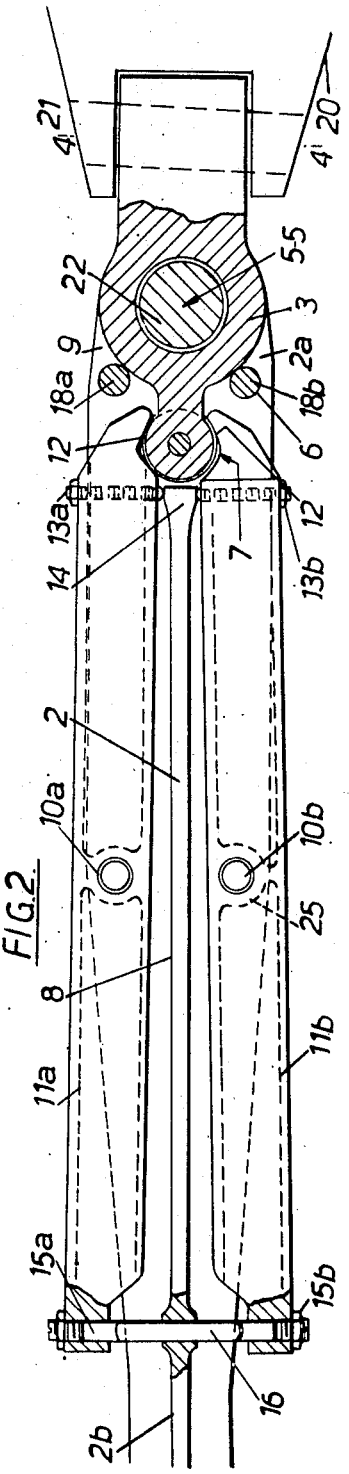
FIG.1
FIG.2

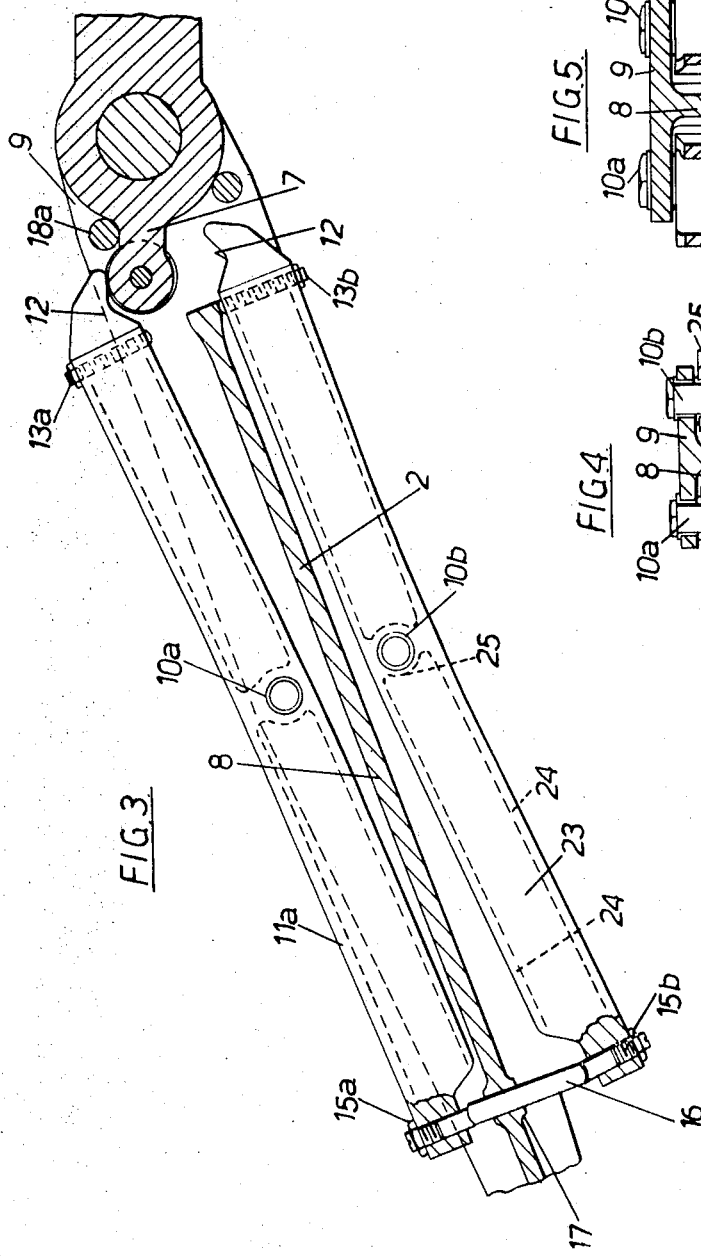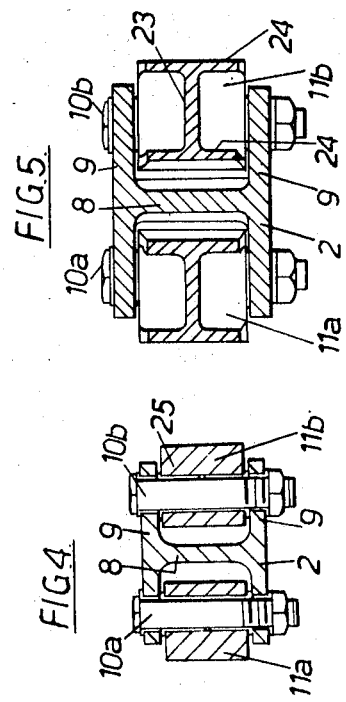

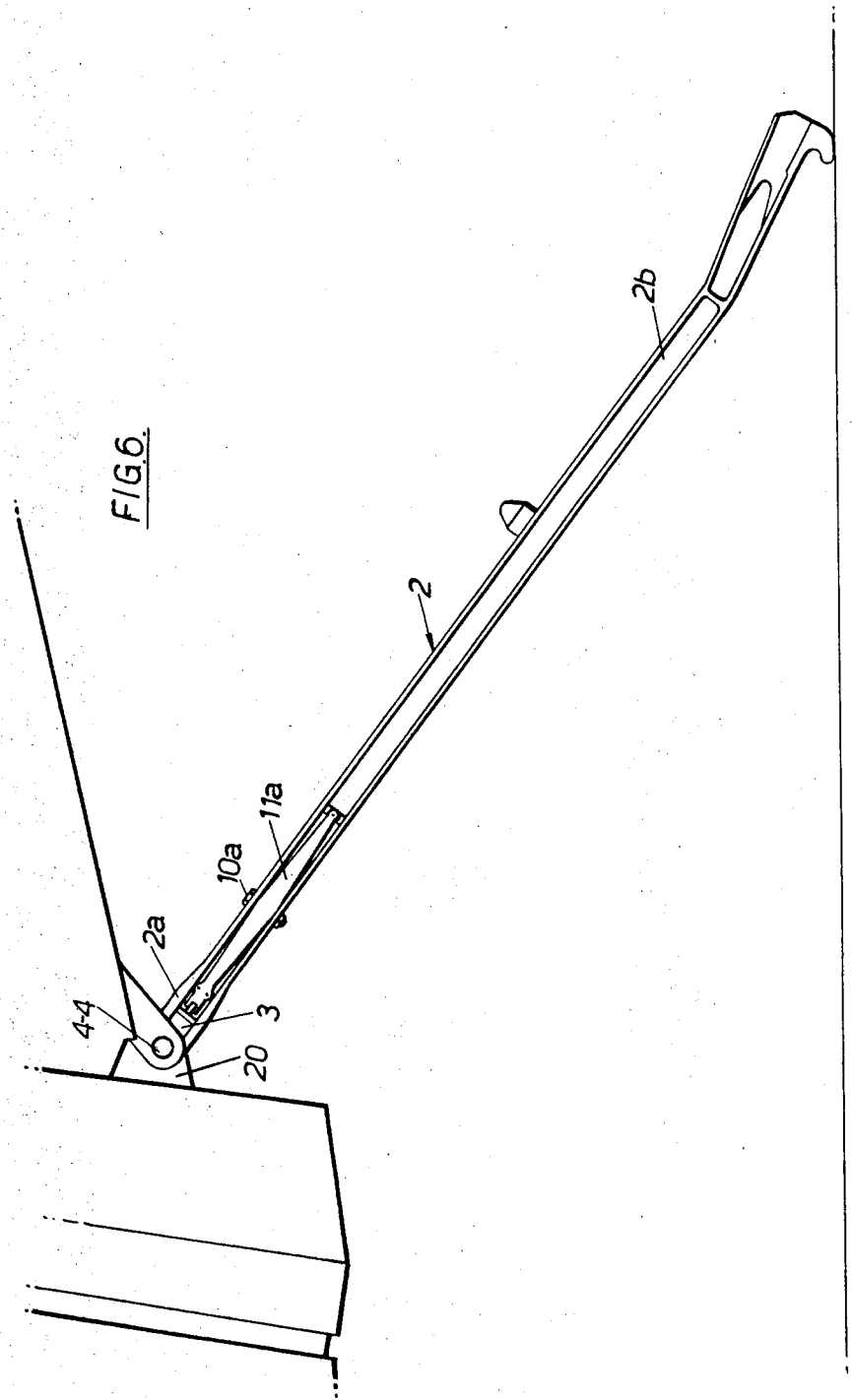

3,582,024

AIRCRAFT ARRESTING HOOK CENTERING MECHANISM

This invention relates to self-centering mechanisms for returning pivotally connected members to a desired angular position in relation to one another.

In general, such mechanisms operate on members which are capable of swinging from a central position, allowing controlled displacement of the members under load, and returning them to the central position as the loads causing the displacements are reduced and are finally removed altogether.

The invention is particularly concerned with self-centering mechanisms suitable for use on aircraft arrester hooks, but also has other uses, for example in the draw gear on railway rolling stock, or on articulated road vehicles.

It is well known to equip aircraft with arrester hooks. Such hooks are mounted at the end of an arm which can be extended from a stowed position to trail from an aircraft so that the hook can engage a yieldable line extending across the landing path of the aircraft. The aircraft can thus be brought rapidly to a standstill.

Arrester hooks are of primary importance to carrier-borne aircraft but are also applicable to land-based aircraft for emergency use.

As the aircraft approaches a landing place, the arrester hook arm normally trails obliquely downwards along the fore-and-aft axis of the aircraft so that the hook forms the lowest point on the aircraft. If the aircraft approaches the landing area at a height lower than normal, the arrester hook is likely to touch the ground before engaging with an arrester line. On many occasions the aircraft has a yaw, that is to say, as seen from above, its fore-and-aft axis is not parallel to the direction of travel of the aircraft relatively to the ground. The oblique angle which the hook arm makes with respect to the ground means that impact with the ground when the aircraft is yawed causes a lateral component of force on the hook.

If the hook is to resist lateral force entirely, then the hook arm requires to be very strong, and consequently very heavy. This is undesirable in an aircraft.

Alternatively, the hook may be designed to displace laterally, but it must then be restored quickly, firstly to ensure that the hook engages the arrester line correctly, and secondly to enable the hook to be retracted into the aircraft body as the aircraft is coming to a halt.

There is thus a need for a self-centering mechanism which is effective but light in weight.

A self-centering mechanism according to this invention comprises a first member and a second member connected to one another by a main pivot and urged towards a predetermined relative angular position by two springs, and each spring has the form of a beam, the springs lying with their lengths substantially parallel to one another and being each mounted on the first member by a respective pivot at an intermediate point in the length of each spring, the three pivots being substantially parallel to one another, each spring having at one end two surfaces to cooperate with abutments respectively on the first member and the second member, and the other ends of the two springs being interconnected so that, upon displacement of the members from the predetermined relative position, both springs are stressed in bending.

Preferably, each spring beam has a web and two flanges, the planes of the flanges being substantially parallel to the three pivots, so that, when the springs are stressed in bending, one flange of each spring is in tension and the other in compression.

Preferably the springs are of I section, but channel section is possible. In either case, a large part of the weight of the spring is positioned where it will undergo maximum strain and hence make the maximum contribution to the restoring torque provided by the mechanism, for a given weight of material in the mechanism. The flanges of each spring may decrease in width towards each end.

Preferably, in use of the invention in an aircraft, the first member comprises the hook arm of an arrester hook and the second member is associated with the aircraft body, but alternatively the second member can comprise the hook arm and the first member can be associated with the aircraft body. The elongated shape of the mechanism is well suited to the space available in an aircraft arrester hook installation.

Preferably the webs of the two springs lie in a common plane, the springs lie one each side of the first member, which is elongated, and the interconnection between the two springs is a push rod, guided to slide in the first member, in a direction perpendicular to the lengths of the springs.

One example of a self-centering mechanism according to the invention and shown as applied to an aircraft arrester hook arm is illustrated in the accompanying drawings, which also serve to illustrate further features which are preferred, although not essential to the invention. In these drawings:

FIG. 1 is a side view of the mechanism;
FIG. 2 is a plan, partly in section on the line II–II in FIG. 1;
FIG. 3 is a similar plan view to that of FIG. 2 but with the hook arm having been angularly displaced through 20°;
FIG. 4 is a cross section on the line IV–IV in FIG. 1;
FIG. 5 is a cross section on the line V–V in FIG. 1; and
FIG. 6 is a side view, on a smaller scale than FIG. 1, showing the whole of the hook arm.

As seen in FIGS. 1, 2, 4 and 5 an arrester hook arm comprises an I-section beam 2, one end 2a of which is attached to a bracket 3 which is itself connected to the rear 20 of an aircraft. To the other end 2b of the beam is connected an arrester hook.

The bracket 3 is pivoted to the rear 20 of the aircraft and to the beam 2 about two mutually perpendicular axes, 4–4 and 5–5 on two pins 21, 22, respectively, the axis 4–4 allowing up-and-down movement of the arm with respect to the aircraft, and the axis 5–5 allowing lateral movement.

The bracket 3 has an extension 6 projecting towards the beam 2, and to it is attached a pair of rollers 7.

The center web 8 of the I-section beam 2 is locally cut away to clear the rollers 7 and to accept the bracket 3. The flanges 9 of the I-section beam 2 provide the mounting for the pin 22; the bracket 3 pivots on this pin and is mounted between the flanges 9.

The flanges 9 are apertured on both sides of the center web 8 to accept pivot bolts 10a and 10b of two springs 11a and 11b respectively. Each spring 11a and 11b comprises a resilient beam pivoted to swing about a point intermediate its ends on the bolt 10a or 10b respectively. FIG. 4, in particular, illustrates the location of the springs 11a and 11b on opposite sides of the center web 8 and in between the flanges 9. In addition to being free to swing about their respective mounting bolts 10a and 10b, the springs 11a and 11b are adapted to be stressed in bending in a plane perpendicular to the axis of the bolts 10a and 10b. This feature will be further described later in the specification. The springs are of I-section to minimize weight, as is shown in FIG. 5, each consisting of a web 23 and two flanges 24. There is a central boss 25 to receive the pivot bolt 10a or 10b. Each flange 24 decreases in width towards each end, as shown in FIG. 1.

The end of each of the springs 11a and 11b nearer to the aircraft terminates in a fork having V-shaped faces 12 which are positioned to engage the rollers 7. The V-shaped faces 12 are arranged to embrace but not quite touch the rollers 7 when the arm 1 is centralized, as shown in FIG. 2.

This arrangement is achieved by means of pairs of screws 13a and 13b which can be adjusted to bear against a thickened end portion 14 of the center web 8. The end of each spring 11a and 11b nearer to the arrester hook has an adjustably positioned screwed spigot member 15a and 15b, each having a concave inner end which is arranged to bear on a convex end of a push rod 16. The rod 16 is guided to slide transversely within a locally thickened portion 17 of the center web 8.

Bolts 18a and 18b extend through the flanges 9 laterally of the trunnion extension 6 to limit displacement of the arm to 20° in each direction. In some embodiments these bolts are unnecessary.

The mechanism can be adjusted as follows:

The arm 2 is positioned centrally, that is to say with no lateral displacement. The screws 13a and 13b are then adjusted to protrude sufficiently from the spring units 11a and 11b such that when the screws bear against the thickened portion 14 of the center web 8, the faces 12 of the spring units 11a and 11b are just clear of the rollers 7.

The spigot members 15a and 15b are simultaneously adjusted to bear on the rod 16 until a desired identical stress in bending (in effect a preloading) is achieved in each spring, which is caused to bend about bolts 10a and 10b as fulcra with parts 14 and 16 at each end as abutments. The mechanism is then fully centered.

It may not be necessary to provide for adjustment at all four places 13a, 13b, 15a, 15b.

The mechanism operates as follows:

Should the hook arm become displaced, for example by premature contact with the ground, an initial slight displacement is unresisted, since the faces 12 do not contact the rollers 7. Thereafter, the faces 12 of one spring, say the spring 11a, are engaged by the rollers 7 and, as displacement of the hook arm increases, the pair of screws 13a of the spring unit 11a are moved away from the portion 14 of the web 8 and the spring unit 11a swings bodily about the pivot bolt 10a and moves the rod 16 through the center web 8 towards the spring 11b. This causes the spring 11b to tend to swing about its pivot bolt 10b, but, since its screws 13a are already against the abutment 14 if the mechanism has been adjusted as described above, this swinging movement is resisted. The hook arm thus experiences a restoring torque, applied to the abutment 14 by the screws 13a. The forces applied to the arm through the pivot bolts 10a and 10b cancel one another. The amount of the restoring torque increases as the displacement of the arm increases, because this displacement causes progressive bending of the two springs 11a, 11b, which are effectively acting in series.

By this arrangement both of the springs 11a and 11b are fully utilized to apply a restoring force to bring the arm 2 and the member 3 associated with the aircraft body back into the desired relationship irrespective of the direction of lateral displacement of the arm.

As one example, the initial restoring torque, which becomes available as soon as one of the pairs of screws 13a or 13b leaves contact with the abutment 14, and which is due to the preloading imparted by adjustment of the spigot members 15a, 15b as described above, is 6,000 pounds-inches. (7,000 kg. cm.) and this torque rises to 20,000 pounds-inches. (23,000 kg. cm.) at the maximum displacement of the arm 2 relatively to the member 3 of 20°.

The material of the springs 11a, 11b, and also of the hook arm 2, may be a high-strength steel, age-hardenable in the martensitic state, the major alloying elements of which are 18 percent nickel, 8 percent cobalt, 5 percent molybdenum and traces of aluminum and titanium. The springs are shaped by forging.

It has been determined that the mechanism shown is only one-half the weight of mechanisms designed for the same purpose and employing conventional leaf springs or coil springs.

Although the invention is illustrated and described in an arrangement in which it opposes merely a lateral displacement, the invention is also applicable to arrangements, both in aircraft and elsewhere, in which a vertical displacement is to be opposed.

We claim:

1. A self-centering mechanism comprising a first member and a second member connected to one another by a main pivot and urged towards a predetermined relative angular position by two springs, in which each spring has the form of a beam, the springs lying with their lengths substantially parallel to one another and being each mounted on the first member by a respective pivot at an intermediate point in the length of each spring, the three pivots being substantially parallel to one another, each spring having at one end two surfaces to cooperate with abutments respectively on the first member and the second member, and the other ends of the two springs being interconnected, so that, upon displacement of the members from the predetermined relative position, both springs are stressed in bending.

2. A mechanism according to claim 1, in which each spring beam has a web and two flanges, the planes of the flanges being substantially parallel to the three pivots, so that, when the springs are stressed in bending, one flange of each spring is in tension and the other in compression.

3. A mechanism according to claim 2, in which the two springs are of I section, with flanges decreasing in width towards each end.

4. A mechanism according to claim 2, in which the webs of the two springs lie in a common plane, the springs lie on each side of the first member, which is elongated, and the interconnection between the two springs is a push rod, guided to slide in the first member, in a direction perpendicular to the lengths of the springs.

5. An aircraft including a mechanism according to claim 1, in which the first member is the hook arm of an arrester hook, and the second member is attached to the aircraft body.